(12) United States Patent
Inoue et al.

(10) Patent No.: US 6,962,547 B2
(45) Date of Patent: Nov. 8, 2005

(54) OIL PRESSURE CONTROL OF TRANSMISSION FOR VEHICLES

(75) Inventors: Naoya Inoue, Fuji (JP); Tateki Jozaki, Fuji (JP); Masayoshi Nakasaki, Fuji (JP)

(73) Assignee: JATCO Ltd, Fuji (JP)

( * ) Notice: Subject to any disclaimer, the term of this patent is extended or adjusted under 35 U.S.C. 154(b) by 16 days.

(21) Appl. No.: 10/674,817

(22) Filed: Oct. 1, 2003

(65) Prior Publication Data

US 2004/0127320 A1 Jul. 1, 2004

(30) Foreign Application Priority Data

Oct. 2, 2002 (JP) .............................. 2002-289820

(51) Int. Cl.$^7$ .......................................... F16H 31/00
(52) U.S. Cl. ................................................... 475/123
(58) Field of Search ................ 192/3–51, 87.15–87.18, 192/109 F; 475/123, 121, 126, 132

(56) References Cited

U.S. PATENT DOCUMENTS 5,046,175 A * 9/1991 Lentz et al. ................... 701/62
5,046,178 A * 9/1991 Hibner et al. ................. 701/60
5,733,220 A 3/1998 Iizuka

FOREIGN PATENT DOCUMENTS

JP 9-68266 A 3/1997

* cited by examiner

*Primary Examiner*—Dirk Wright
(74) *Attorney, Agent, or Firm*—Foley & Lardner LLP (57) ABSTRACT

An oil pressure control device, which changes a range of a vehicle transmission includes: a pressure adjusting device that engages or releases forward and reverse frictional-engagement devices by adjusting an oil pressure supply, a sensor that detects a range selected by a vehicle driver, and a controller that controls the clutch pressure adjusting device based on a signal from the sensor. When the stop range is selected after selecting the reverse (forward) range, a forward (reverse) range is selected. After supplying an initial oil pressure to the forward (reverse) frictional-engagement device, the pressure adjusting device is controlled so that the pressure decreases from the initial oil pressure to a predetermined oil pressure. Subsequently, the oil pressure is initially increased at a small increase rate from the predetermined oil pressure. After a predetermined time period has elapsed, the pressure adjusting device increases the oil pressure at a large increase rate.

10 Claims, 11 Drawing Sheets

OIL PRESSURE CONTROL OF TRANSMISSION FOR VEHICLES

BACKGROUND

This invention relates to a control device for a belt type continuously variable transmission for vehicles used in a power train which transmits the driving force of an engine to a drive wheel.

Tokkai Hei 09-68266 published by the Japanese Patent Office in 1997 discloses an automatic transmission for vehicles which performs a precharge to rapidly fill an oil supply pipe with oil when a clutch is engaged from a released state. This prior art technology can shorten the time required for a clutch engagement by raising the oil pressure for the clutch promptly to an initial pressure.

However, in this prior art technology, for example when the driver operates a shift lever in the order R→N→D or R→D to change the operating range of the transmission from reverse range to drive range and start the vehicle, there is a large shock in a clutch engagement due to the backlash of the power train.

SUMMARY

It is, therefore, an object of this invention to provide an oil pressure control of a vehicle transmission which enables smooth starts regardless of the shift operation of a driver.

To achieve the aforementioned object, this invention provides an oil pressure control device for changing the operating range of a vehicle transmission, the operating range including at least a drive range which advances the vehicle, a reverse range which reverses the vehicle and a stop range which stops the vehicle. The transmission has a forward/reverse change-over part which is provided with a forward clutch which transmits a drive force generated by an engine to the transmission as a drive force which advances the vehicle, and a reverse clutch which transmits a drive force generated by the engine to the transmission as a drive force which reverses the vehicle, wherein only the forward clutch is engaged by oil pressure in the drive range, only the reverse clutch is engaged by oil pressure in the reverse range, and both the forward clutch and reverse clutch are released in the stop range. The transmission further has a speed change part connected to the forward/reverse change-over part.

The oil pressure control device comprises a clutch pressure adjusting device which adjusts the oil pressure from a pump, and engages or releases the forward clutch and reverse clutch by supplying the adjusted oil pressure to one of the forward clutch and reverse clutch, a sensor which detects an operating range selected by a driver of the vehicle, and a controller which controls the clutch pressure adjusting device based on a signal from the sensor.

The controller functions to control the clutch pressure adjusting device to supply an initial oil pressure to the forward clutch and subsequently decrease the supplied oil pressure from the initial oil pressure to a predetermined oil pressure, when the drive range is selected after the stop range has been selected from the reverse range; control the clutch pressure adjusting device to increase the supplied oil pressure at a small increase rate from the predetermined oil pressure during a predetermined time period; and after the predetermined time period has elapsed, control the clutch pressure adjusting device to increase the supplied oil pressure at a large increase rate.

The controller further functions to control the pressure adjusting device to supply an initial oil pressure to the reverse clutch and subsequently decrease the supplied oil pressure from the initial oil pressure to a predetermined oil pressure, when the reverse range is selected after the stop range has been selected from the drive range; control the clutch pressure adjusting device to increase the supplied oil pressure at a small increase rate from the predetermined oil pressure during a predetermined time period; and after the predetermined time period has elapsed, control the clutch pressure adjusting device to increase the supplied oil pressure at a large increase rate.

The details as well as other features and advantages of this invention are set forth in the remainder of the specification and are shown in the accompanying drawings.

BRIEF DESCRIPTION OF THE DRAWINGS

FIG. 7 is a graph showing an effect when a subroutine "A'" of a Step S42 (or the subroutine "A" of the Step S22) of FIG. 2 is performed.

FIG. 8 is graph showing an effect when the subroutine "B" of a Step S21 of FIG. 2 is performed.

FIG. 9 is graph showing an effect when the subroutine "C" of a Step S20 of FIG. 2 is performed.

DESCRIPTION OF THE PREFERRED EMBODIMENTS

Figure 1:
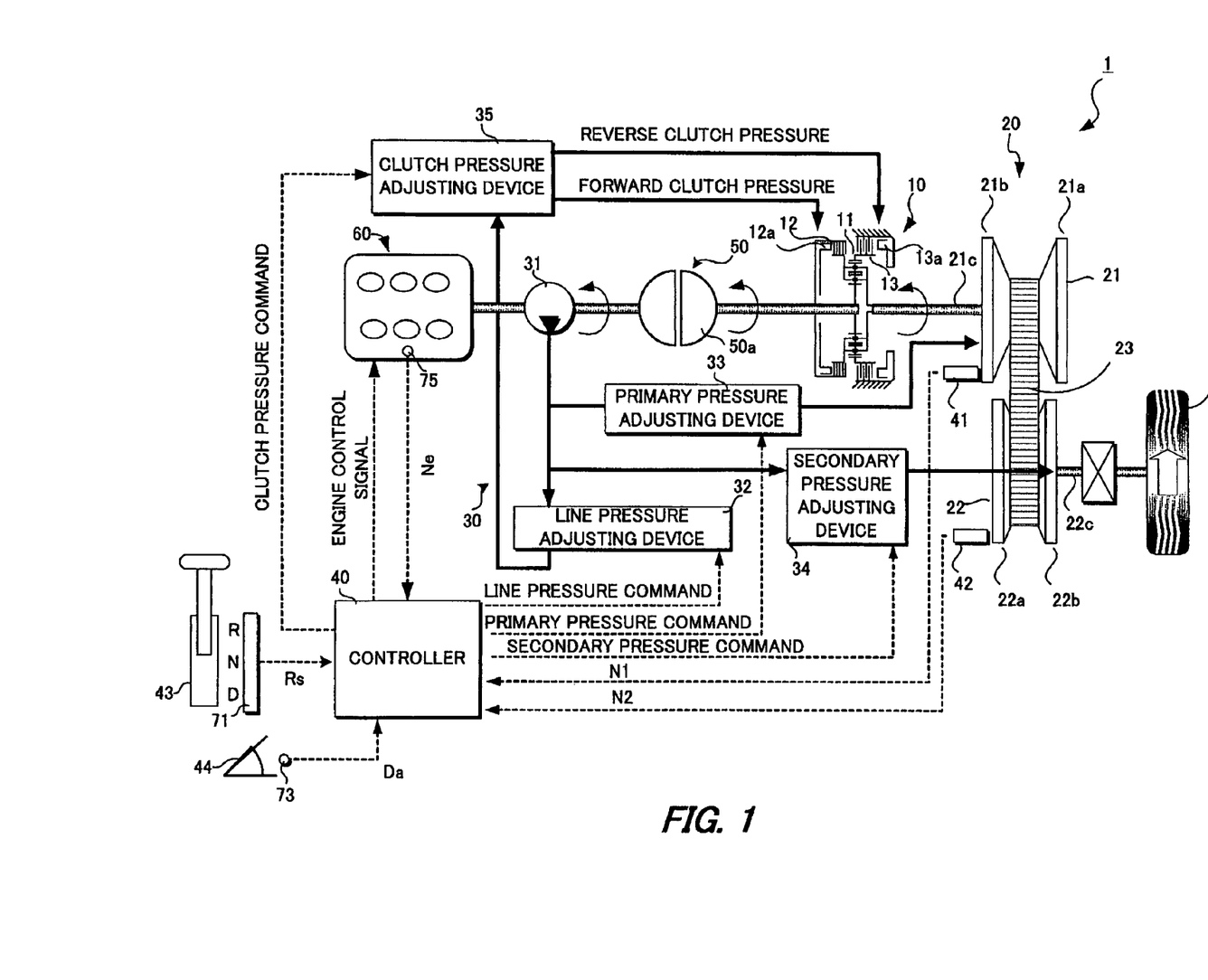
FIG. 1 is a schematic view of a vehicle transmission to which the oil pressure control of this invention is applied.

Referring to FIG. 1, one embodiment of a belt type continuously variable transmission system for vehicles according to this invention will be described.

A transmission 1 is provided with a forward/reverse change-over part 10, a speed change part 20, an oil pressure adjustment part 30, a controller 40 and a torque converter 50. The transmission 1 slows down the rotation of an engine 60, and transmits it to a drive wheel 70. The power transfer system from the engine 60 to the drive wheel 70 is referred to as a power train. The power train is provided with the transmission 1, an idler gear and a differential gear. The controller 40 includes: a microcomputer provided with a central processing unit (CPU) that executes programs, read-only memory (ROM) that stores programs and data, random access memory (RAM) that temporarily stores the computation results of the CPU and acquired data, a timer for measuring time, and an input/output interface (I/O interface).

The forward/reverse change-over part 10 comprises a planetary gear 11 for changing a power transfer path between a forward clutch 12 and a reverse clutch 13 (in other words, reverse brake). The forward clutch 12 is connected to a forward clutch piston. When the vehicle moves forward, the forward clutch 12 is engaged with the planetary gear 11 by an oil pressure (forward clutch pressure) supplied to a forward clutch piston chamber 12a from a clutch pressure adjusting device 35. The reverse clutch 13 is connected to a reverse clutch piston. When the vehicle reverses, the reverse clutch 13 is engaged with the planetary gear 11 by an oil pressure (reverse clutch pressure) supplied to a reverse clutch piston chamber 13a from the clutch pressure adjusting device 35. When the transmission is in a neutral range or a parking range, oil pressure is not supplied from the clutch pressure adjusting device 35, and thereby both the forward clutch 12 and the reverse clutch 13 are released.

In the following, "clutch pressure" means an oil pressure supplied from the clutch pressure adjusting device 35, i.e., forward clutch pressure or reverse clutch pressure. The clutch pressure adjusting device 35 adjusts the oil pressure (forward clutch pressure, reverse clutch pressure) supplied to the forward clutch 12 and reverse clutch 13 according to a command from the controller 40, and thereby controls the engaging state of the clutch. When the forward clutch 12 or reverse clutch 13 is engaged with the planetary gear 11 from the release state, the clutch pressure adjusting device 35 rapidly supplies (precharges) oil and, therefore, the oil pressure of the forward/reverse change-over part 10 rises promptly to an initial pressure Pi.

The operating range of the transmission is selected by a driver via a shift lever 43. The operating range of the transmission includes at least a drive (D) range (shown), a reverse (R) range (shown), a neutral (N) range (shown), and a parking (P) range (not shown). Hereafter, in this specification, the N range and P range may be generally referred to as stop ranges. The shift lever 43 is located in any one of a D range position for selecting the D range, a N range position for selecting the N range, a R range position for selecting the R range, and a P range position for selecting the P range of the transmission. A shift position sensor 71 generates a range signal Rs showing the selected operating range of the transmission and sends it to the controller 40, i.e., it detects the position of the shift lever 43. The shift position sensor 71 may be referred to as an inhibitor switch. Thus the range signal Rs comprises at least a drive (D) range signal, a reverse (R) range signal, a neutral (N) range signal and a parking (P) range signal.

The engaging of the forward clutch 12 and reverse clutch 13 is performed selectively. When the range signal Rs is a D range signal, the forward clutch 12 is engaged by supplying a forward clutch pressure to advance the vehicle, and the reverse clutch 13 is released by releasing the reverse clutch pressure to a drain. On the other hand, when the range signal Rs is an R range signal, the reverse clutch 13 is engaged by supplying a reverse clutch pressure to reverse the vehicle, and the forward clutch 12 is released by releasing forward clutch pressure to the drain. When the range signal Rs is a N range signal or a P range signal, both the forward clutch 12 and reverse clutch 13 are released by releasing forward clutch pressure and reverse clutch pressure to the drain.

In this embodiment, a belt type continuously variable speed change part is illustrated as the speed change part 20. This speed change part 20 is provided with a primary pulley 21, secondary pulley 22 and V belt 23.

The primary pulley 21 is a pulley on the input shaft side into which the torque from the engine 60 is inputted. The primary pulley 21 is provided with a fixed conical plate 21a, which rotates together with an input shaft 21c, and a movable conical plate 21b, which faces the fixed conical plate 21a and thereby forms a V-shaped pulley groove with the fixed conical plate 21a. The movable conical plate 21b is free to displace in an axial direction due to an oil pressure (henceforth, "primary pressure") that acts on the primary pulley. The rotation speed N1 of the primary pulley 21 is detected by a primary pulley rotation speed sensor 41.

The secondary pulley 22 transmits the torque transmitted by the V belt 23 to the drive wheel 70 via an idler gear or a differential gear. The secondary pulley 22 is provided with a fixed conical plate 22a, which rotates together with the output shaft 22c, and a movable conical plate 22b, which is free to displace in an axial direction according to an oil pressure (henceforth, "secondary pressure") that acts on the secondary pulley. The movable conical plate 22b faces the fixed conical plate 22a, thereby forming a V-shaped pulley groove with the fixed conical plate 22a. Herein, the pressure-receiving surface area of the primary pulley and the pressure-receiving surface area of the secondary pulley are effectively equivalent. The rotation speed N2 of the secondary pulley 22 is detected by a secondary pulley rotation speed sensor 42. Herein, a vehicle speed is computed from the rotation speed of this secondary pulley 22.

The V belt 23, which is wound around the primary pulley 21 and the secondary pulley 22, transmits the torque (that is inputted into the primary pulley 21 from the engine 60) to the secondary pulley 22. The oil pressure adjustment part 30 is provided with an oil pump 31, a line pressure adjusting device 32, a primary pressure adjusting device 33, a secondary pressure adjusting device 34, and a clutch pressure adjusting device 35. The oil pump 31, which is driven by the engine 60, feeds oil under pressure.

The line pressure adjusting device 32 adjusts the pressure of the oil supplied from the oil pump 31 to a predetermined line pressure according to a command signal (for example, duty signal etc.) from the controller 40. The predetermined line pressure is varied according to the running state of the vehicle. The primary pressure adjusting device 33 is a device that controls the primary pressure, and for example comprises a solenoid or a servo link and step motor that form a mechanical feedback mechanism. The secondary pressure adjusting device 34, which is controlled by a command from the controller 40, (a) further decompresses the line pressure that has been adjusted by the line pressure adjusting device 32, and (b) adjusts the secondary pressure according to the running state.

The clutch pressure adjusting device 35 adjusts the oil pressure from the line pressure adjusting device 32 based on an oil pressure command value of the controller 40, and supplies the adjusted oil pressure to the forward/reverse change-over part 10. In this way, the forward clutch 12 and reverse clutch 13 can be engaged or released.

Based on the running state of the vehicle, the controller 40 determines the oil pressure command value, and supplies it to the clutch pressure adjusting device 35. The running state includes the vehicle speed detected by the secondary pulley rotation speed sensor 42, the operating range of the transmission selected by the shift lever 43, an accelerator pedal depression amount Da detected by an accelerator pedal sensor 73, and an engine rotation speed Ne detected by an engine rotation speed sensor 75.

The controller 40 commands the clutch pressure adjusting device 35 to adjust the oil pressure supplied to the forward clutch 12 and reverse clutch 13. By controlling the clutch pressure adjusting device 35, the controller 40 rapidly supplies (precharges) oil when the forward clutch 12 or reverse clutch 13 is engaged from the release state. Due to this rapid supply (precharge), the oil pressure of the forward/reverse clutch rises promptly to the initial pressure Pi.

The controller 40: (a) reads: (i) the input torque to the speed change part 20, (ii) the speed ratio, (iii) the operating range of the transmission, (vi) the vehicle speed (secondary pulley rotation speed), (v) the accelerator pedal depression amount Da, (vii) the oil temperature and oil pressure, (b) determines a target speed ratio, (c) computes target values of the primary pressure and secondary pressure for realizing the target speed ratio, and (d) corrects the target pressure if necessary. The input torque to the speed change part 20 is calculated based on the engine rotation speed Ne. The oil temperature is detected by a temperature sensor (not shown), and the oil pressure is detected by a pressure sensor (not shown). Subsequently, the controller 40 controls the line pressure adjusting device 32, primary pressure adjusting device 33 and secondary pressure adjusting device 34 to achieve the target pressure. The line pressure adjusting device 32, primary pressure adjusting device 33 and secondary pressure adjusting device 34 adjust the oil pressure supplied to the primary pulley 21 and the secondary pulley 22. Due to this, the movable conical plate 21b and movable conical plate 22b perform an oscillating motion in the rotation axis direction, and the pulley groove width of the primary pulley 21 and the secondary pulley 22 varies. Hence, the V belt 23 moves on the primary pulley 21 and the secondary pulley 22, the contact radius of the V belt 23 with the primary pulley 21 and the secondary pulley 22 changes, and the speed ratio is controlled. Herein, the speed ratio is the ratio of the rotation speed of the primary pulley and the rotation speed of the secondary pulley.

When the accelerator pedal 44 is depressed and there is a shift change in the manual mode, the controller 40 sends a command signal to the line pressure adjusting device 32, the primary pressure adjusting device 33, and the secondary pressure adjusting device 34, causing the movable conical plate 21b of the primary pulley 21 and the movable conical plate 22b of the secondary pulley 22 to displace in an axial direction. Thereby, the contact radius with the V belt 23 changes, and the speed ratio varies continuously.

The controller 40 controls engine torque and rotation speed by controlling (a) the fuel injection amount of the engine 60, and (b) the throttle opening. A torque converter 50 is installed between the engine 60 and forward/reverse change-over part 10, and transmits the torque of the engine 60 by the oil flow of the inside oil.

If the engine rotation speed is Ne, the torque converter capacity coefficient is τ, and the torque converter torque ratio is t, the input torque Tin to the torque converter 50 and the output torque Tout from the torque converter 50 are respectively given by:

$$Tin = \tau \times Ne^2$$

$$Tout = \tau \times Ne^2 \times t$$

Thus, the transferred torque of the torque converter 50 is determined by the engine rotation speed. The input torque to the speed change part 20 corresponds to the output torque Tout from the torque converter 50 when the forward/reverse clutch is engaged.

According to this invention, when the D range is selected after the R range as for example in R→N→D or R→D, the controller 40 commands the clutch pressure adjusting device 35 to suitably adjust the clutch pressure, and thereby prevent an increase of engaging shock.

Also, when the R range is selected after the D range as for example in the order of D→N→R or D→R, the controller 40 commands the clutch pressure adjusting device 35 to suitably adjust the clutch pressure, and thereby prevents an increase of engaging shock.

Figure 2:
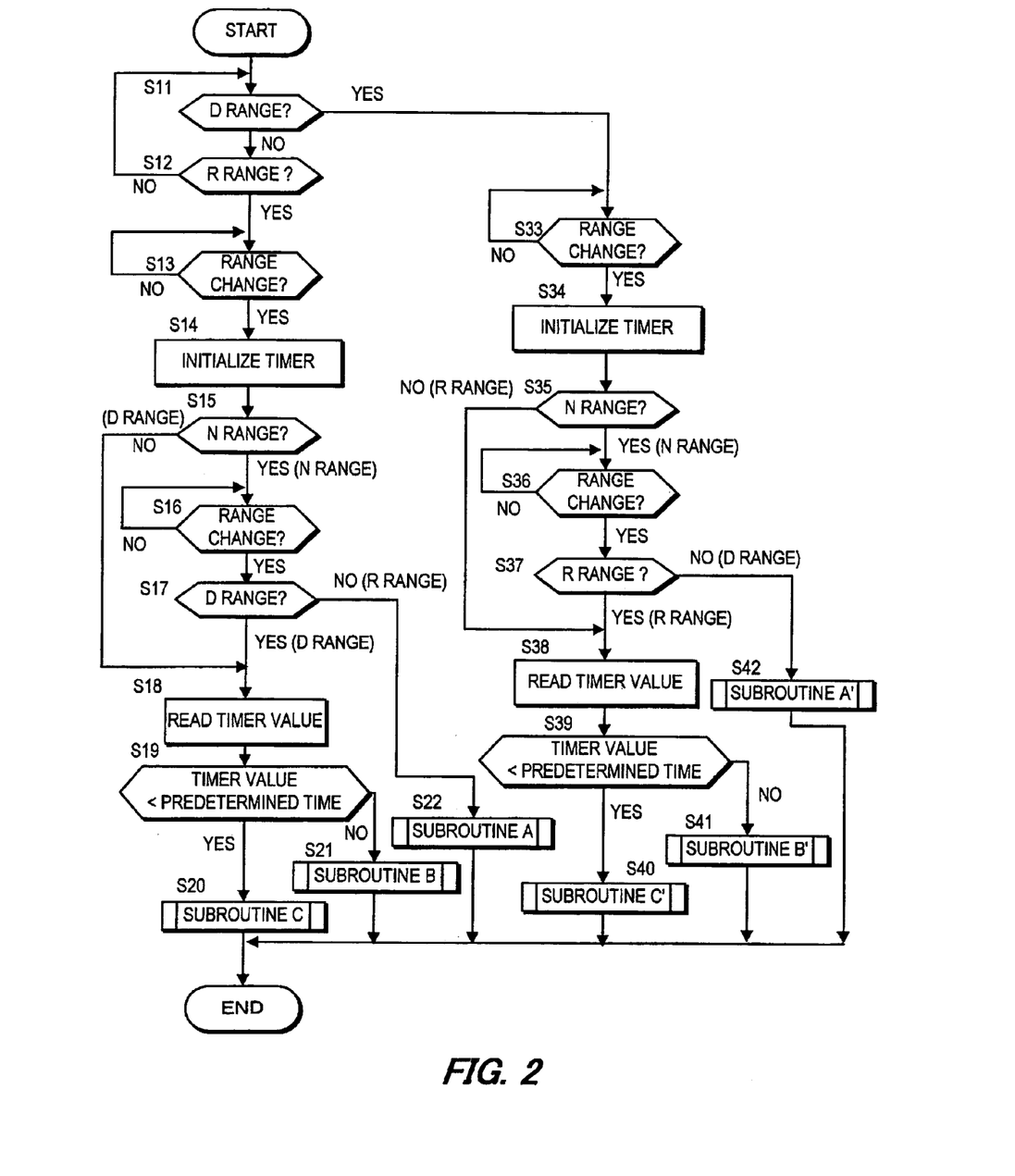
FIG. 2 is a main flowchart showing a control routine performed by a controller according to this invention.

Referring to FIG. 2, the control routine executed by the controller 40 will now be described.

FIG. 2 is a flowchart showing the main routine which describes the processing of the controller. The main routine is executed repeatedly. In the following, the N range represents the state of the transmission 1 wherein both the forward clutch 12 and reverse clutch 13 are released, but the P range may be used instead.

In a Step S11, based on the range signal Rs, it is determined whether or not the D range is selected. When the D range is selected (i.e., when a D range signal has occurred), the routine proceeds to a Step S33. If the determination is negative, the routine proceeds to a Step S12.

In the Step S12, based on the range signal Rs, it is determined whether or not the R range is selected. When the R range is selected, i.e., when the R range signal has appeared, the routine proceeds to a Step S13. If the determination is negative, the routine returns to the Step S11.

In the Step S13, the routine waits until the range signal Rs is changed from the R range signal to another range signal. When the range signal Rs has been changed, the routine proceeds to a Step S14. In the Step S14, a timer is initialized.

In a Step S15, it is determined whether or not the N range is selected. When the N range is selected, the routine proceeds to a Step S16. If the determination is negative (the D range is selected in this case), the routine proceeds to a Step S18. In the Step S16, the routine waits until the N range signal changes to another range signal. If the range signal Rs is changed, the routine proceeds to a Step S17. In the Step S17, it is determined whether or not the D range is selected. When the D range is selected, the routine proceeds to a Step S18. If the determination is negative (i.e., the R range is selected), the routine proceeds to a Step S22.

In the Step S18, the time of the timer is read. Due to this, the period for which the shift lever 43 was in the N range position, i.e., the period when the N range was selected, is acquired.

In a Step S19, it is determined whether or not the time of the read timer is less than a predetermined time. This predetermined time is a time required to eliminate the engaging torque of the reverse clutch 13. This predetermined time is a required time for the oil pressure supplied to the reverse clutch to decrease to zero, and is dependent on the specifications of the oil pressure system, oil temperature, etc.

If the time of the read timer is less than the predetermined time, the routine proceeds to a Step S20. If the time of the read timer is equal to or more than a predetermined time, the routine proceeds to a Step S21.

In the Step S20, Step S21 and Step S22, the subroutine "C", subroutine "B" and subroutine "A" are executed. The details of these subroutines are described later.

In a Step S33, the routine waits until the range signal Rs changes from the D range signal to another range signal. When the range signal Rs is changed, the routine proceeds to a Step S34. In the Step S34, a timer is initialized. In a Step S35, it is determined whether or not the N range is selected. When the N range is selected, the routine proceeds to a Step S36. If the determination is negative (i.e., the R range is selected in this case), the routine proceeds to a Step S38.

In the Step S36, the routine waits until the range signal Rs changes from the N range signal to another range signal. When the range signal Rs is changed, the routine proceeds to a Step S37. In the Step S37, it is determined whether or not the R range is selected.

When the R range is selected, the routine proceeds to the Step S38. When the determination is negative (i.e., the D range is selected in this case), the routine proceeds to a Step S42. In the Step S38, the time of the timer is read. Thereby, a period during which the shift lever 43 was in the N range position, i.e., the period when the N range was selected, is acquired.

In a Step S39, it is determined whether or not the time of the read timer is less than a predetermined time. If the time of the read timer is less than the predetermined time, the routine proceeds to a Step S40. If the time of the read timer is equal to or more than the predetermined time, the routine proceeds to a Step S41. This predetermined time is a required time for the oil pressure supplied to the forward clutch to decrease to zero, and is dependent on the specification of an oil pressure system, oil temperature, etc.

In a Step S40, a Step S41 and a Step S42, a subroutine "C'", a subroutine "B'" and a subroutine "A'" are executed. The details of these subroutines will be described later.

Figure 3A:
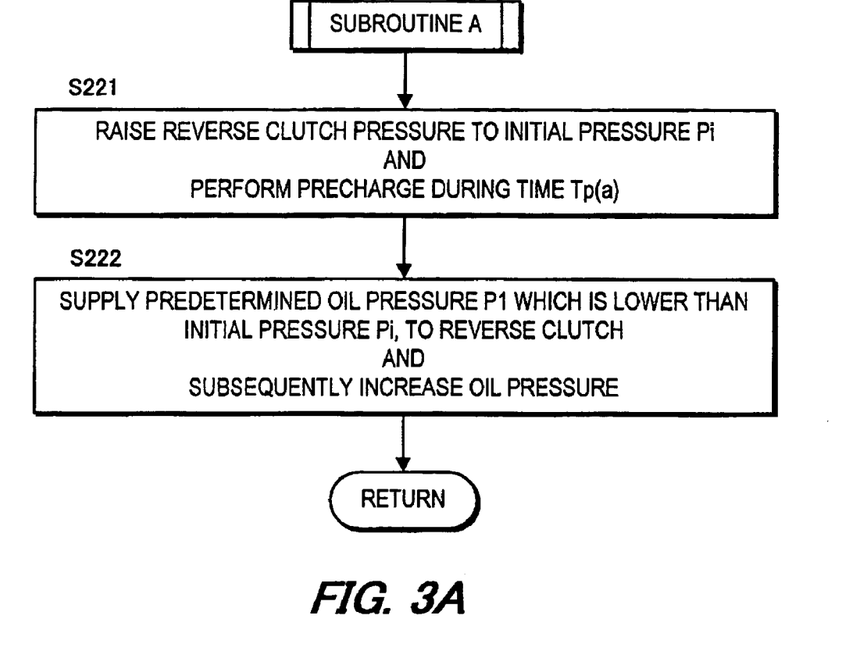
FIG. 3A is a flowchart showing a subroutine "A" performed in a Step S22 of FIG. 2.

Referring to the flowchart of FIG. 3A, the subroutine "A" executed in the Step S22 will be described.

When the range is selected in the order R range →N range →R range, the subroutine "A" is executed. In this case, when the power train is reversing, the vehicle reverses further. At this time, the gears of the power train are stuck in the rotation direction which causes the vehicle to reverse, and no gear backlash occurs. For this reason, there is no possibility that a shock due to a gear collision when the vehicle starts reversing, will arise.

In a Step S221, precharge is performed by rapidly filling oil in the reverse clutch 13, and raising the oil pressure to the initial pressure Pi. In a Step S222, precharge is terminated, and a predetermined oil pressure P1 (which is lower than the initial pressure Pi) is supplied to engage the clutch. Namely, the oil pressure is decreased from the initial pressure Pi to the predetermined oil pressure P1. Then, the supplied oil pressure is increased. As described above, a shock resulting from the collision of gears in the drive train does not occur, so by executing the subroutine "A" instead of the subroutine "B" and subroutine "C" described later, the response time of the transmission is shortened by applying oil pressure early.

Figure 4A:
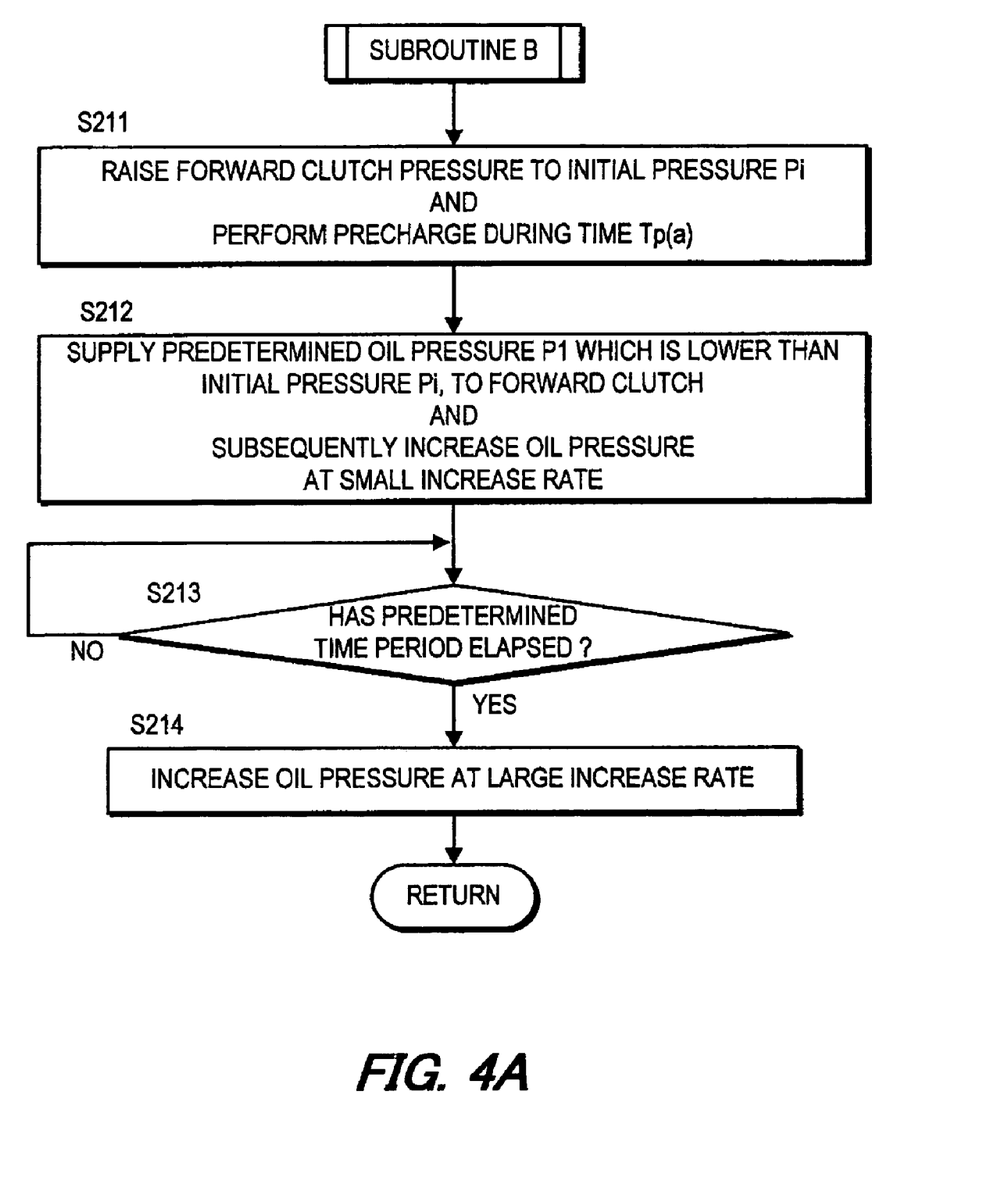
FIG. 4A is a flowchart showing a subroutine "B" performed in a Step S21 of FIG. 2.

Referring to the flowchart of FIG. 4A, the subroutine "B" executed in the Step S21 will now be described.

When the range of the transmission is selected in the order R range →N range →D range, the subroutine "B" is executed. In this case, although the power train was in the reverse position, the vehicle then moves forward. At this time, the gears of the power train are stuck in the rotation direction which causes the vehicle to reverse, and a gear backlash occurs. For this reason, a shock resulting from a gear collision may arise when the vehicle starts. However, as sufficient time has elapsed after selecting the N range (step S19), oil is completely discharged from the reverse clutch piston chamber 13a of the reverse clutch 13, and there is no fear of an interlock. Here, interlock means simultaneous engaging of the forward clutch 12 and reverse clutch 13 with the planetary gear 11.

In a Step S211, precharge is performed by rapid filling of oil in the forward clutch 12, and the oil pressure rises to the initial pressure Pi. In a Step S212, precharge is terminated, and the predetermined oil pressure P1 (which is lower than the initial pressure Pi) is supplied to the clutch to engage the clutch. Namely, the oil pressure is decreased from the initial pressure Pi to the predetermined oil pressure P1. The magnitude of the predetermined oil pressure supplied at this time will be described later. Then, the oil pressure is increased at a small increase rate.

After the predetermined time period has elapsed in a Step S213, the clutch pressure rises at a large increase rate (i.e. a predetermined increase rate larger than the small increase rate) in the Step S214. The length of the predetermined time period at this time will be described later (it corresponds to the time period t23–t24 in FIG. 8D).

Figure 5A:
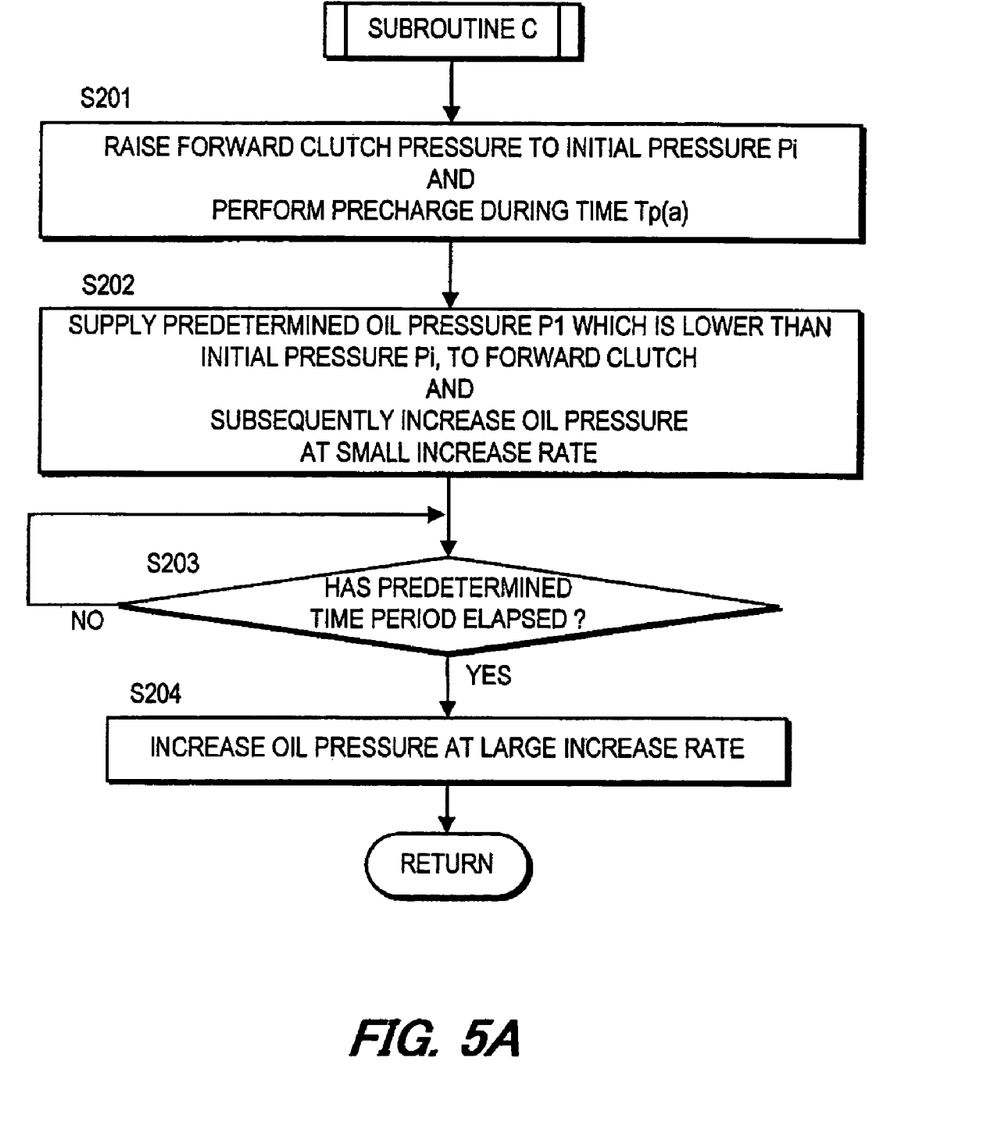
FIG. 5A is a flowchart showing a subroutine "C" performed in a Step S20 of FIG. 2.

Referring to the flowchart of FIG. 5A, the subroutine "C" performed in the Step S20 will now be described.

When the range of the transmission is selected in the order R range →D range, or in the order R range→N range→D range, and the time for which the N range was selected is very short, the subroutine "C" is executed. In this case, although the power train was in the reverse state, the vehicle then attempts to move forward. At this time, if the gear is stuck in the rotation direction causing the vehicle to reverse, it is in a state where a gear backlash occurs. For this reason, a shock may occur due to a gear collision when the vehicle starts. Also, as sufficient time has not elapsed since selecting the N range (step S19), oil does not finish discharging from the reverse clutch piston chamber 13a of the reverse clutch 13, and there is a risk of an interlock. The interlock is caused by a time delay between change of the shift lever 43 from the R range position to the N range position and complete discharge of oil from the reverse clutch piston chamber 13a.

In a Step S201, precharge is performed by rapidly filling oil in the forward clutch 12, and the oil pressure rises to the initial pressure Pi. In a Step S202, precharge is completed, and the predetermined oil pressure P1 (which is lower than the initial pressure Pi) is supplied to engage the clutch. Namely, the oil pressure is decreased from the initial pressure Pi to the predetermined oil pressure P1. The magnitude of the predetermined oil pressure at this time will be described later. Then, the oil pressure is increased at a small increase rate.

After a predetermined time period has elapsed in a Step S203, the oil pressure rises at a large increase rate (i.e. a predetermined increase rate larger than the small increase rate) in a Step S204. The length of the predetermined time period at this time will be described later (it corresponds to the time period t42–t43 in FIG. 9D).

Figure 3B:
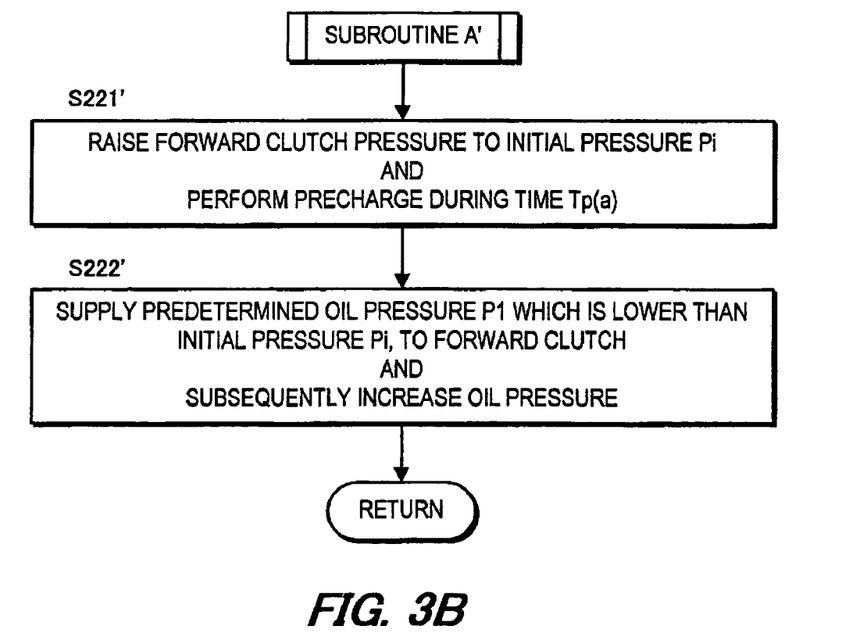
FIG. 3B is a flowchart showing a subroutine "A'" performed in a Step S42 of FIG. 2.
Figure 4B:
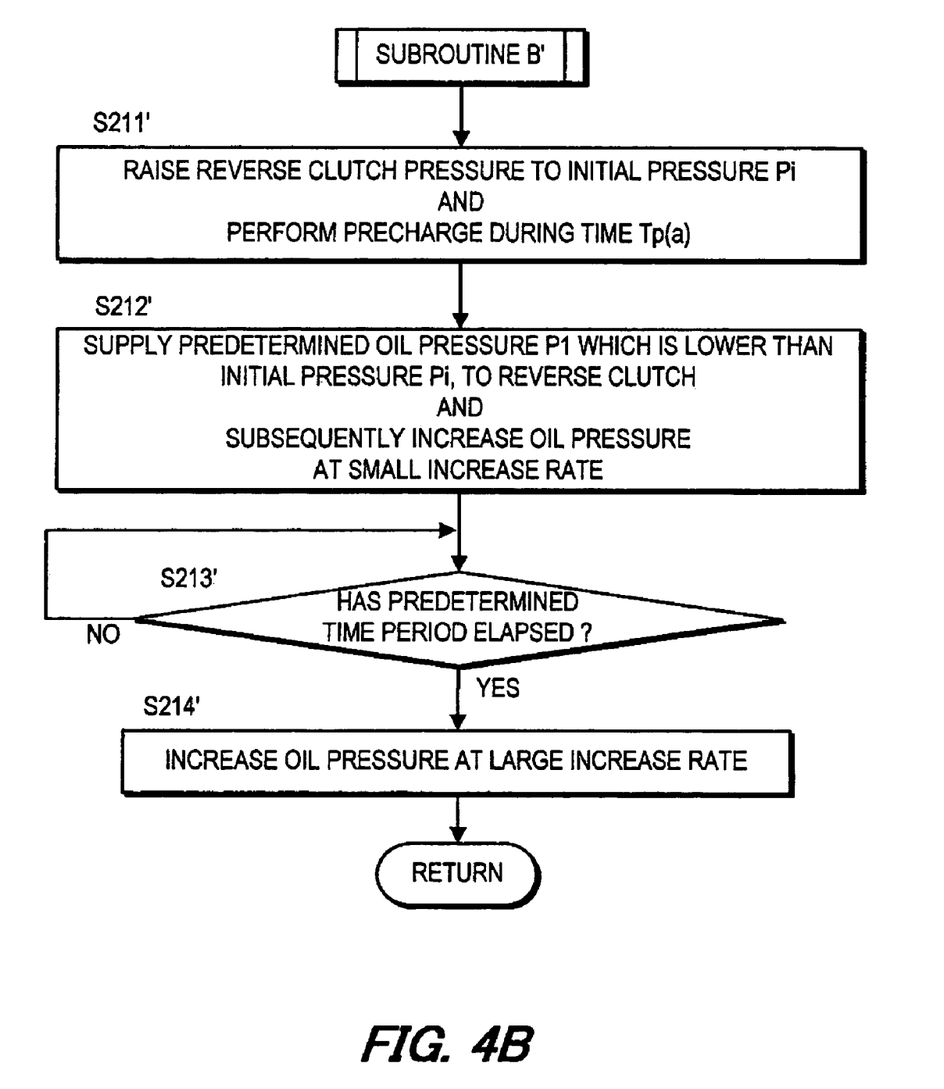
FIG. 4B is a flowchart showing a subroutine "B'" performed in a Step S41 of FIG. 2.
Figure 5B:
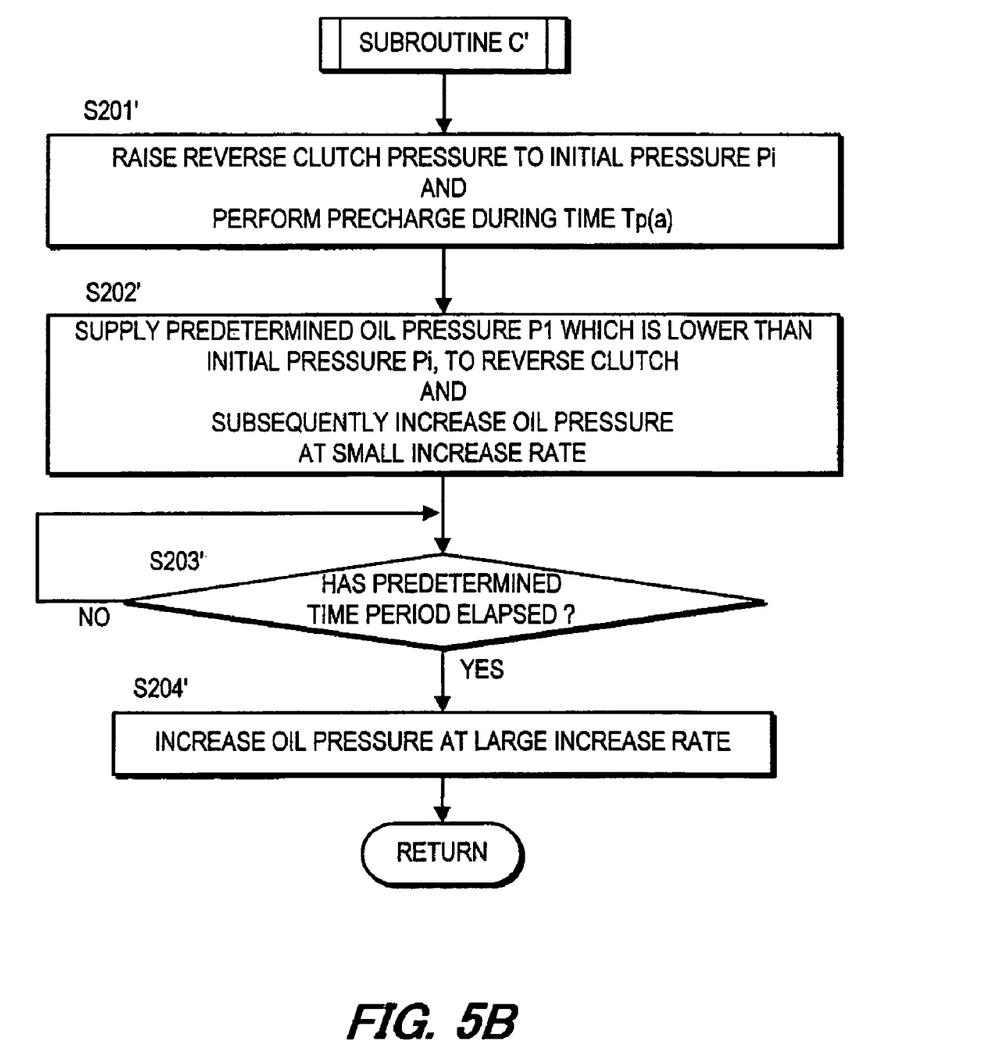
FIG. 5B is a flowchart showing a subroutine "C'" performed in a Step S40 of FIG. 2.

The processing "C'" in the Step S40, the processing "B'" in the Step S41 and the processing "A'" in the Step S42 are respectively based on the processing "C", the processing "B", and the processing "A". As shown in FIGS. 3B, 4B and 5B, in the processing C', processing "B'" and processing "A'", forward and reverse are only replaced in the above processing "C", processing "B" and processing "A", so their description will be omitted.

Figure 6:
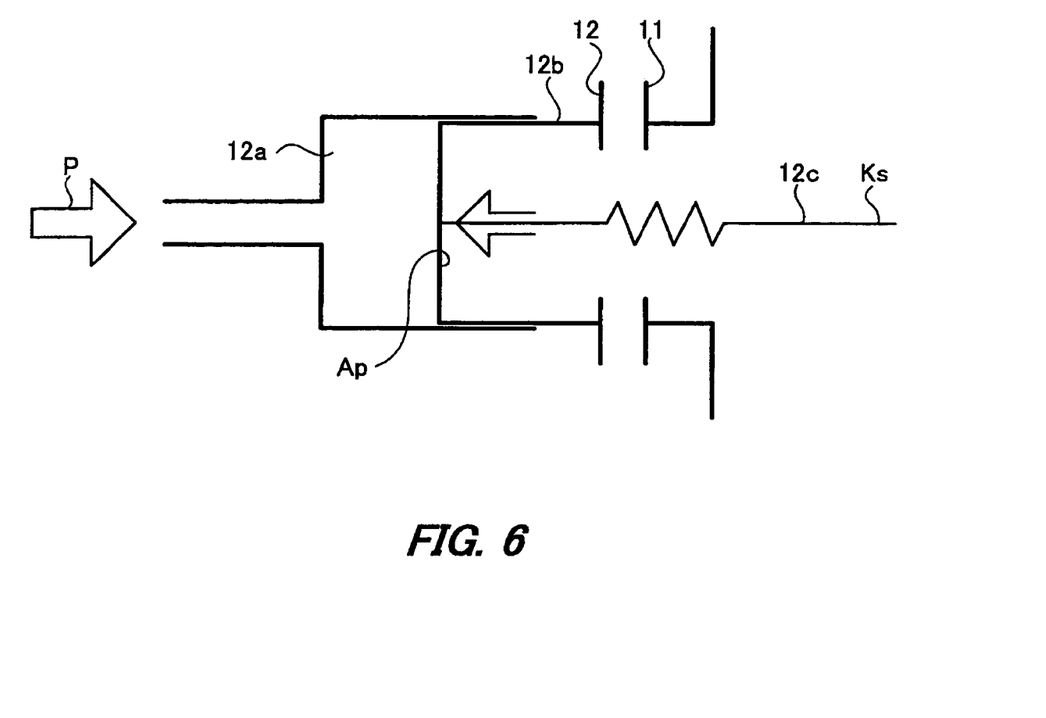
FIG. 6 is a schematic diagram showing the engaging/release mechanism of a clutch in a forward/reverse change-over part.

Referring to FIG. 6, the engaging/release mechanical part of the clutch of the forward/reverse change-over part will now be described.

The forward clutch 12 is connected to a forward clutch piston 12b. The forward clutch 12 is engaged with and released from the planetary gear 11 by the force of the oil pressure (pressure of forward clutch) supplied to the forward clutch piston chamber 12a, and the force of a clutch piston spring 12c. If the oil pressure supplied to the forward clutch piston chamber 12a (forward clutch pressure) is P, the pressure-receiving surface of the clutch piston 12b is Ap, the stroke amount of the clutch piston 12b with respect to a free length of the clutch piston spring 12c is s and the spring constant of the clutch piston spring 12c is Ks, the following relation exists: P×Ap =Ks×s.

Therefore, if an oil pressure P defined as P=Ks×s/Ap is supplied, the clutch piston 12b will be in a stop state wherein the vehicle does not move forward or reverse. In other words, the oil pressure P is equal to the pressure applied by the clutch piston spring 12c to the clutch piston 12b.

Referring to FIG. 7, the effect when the subroutine "A'" of the Step S42 is executed, will be described. A similar effect is obtained when the subroutine "A" of the Step S22 is executed. This is the case where the D range is selected again after the N range has been selected from the D range. This mode may for example be realized when the vehicle starts after temporarily stopping at a signal.

Figure 7A:
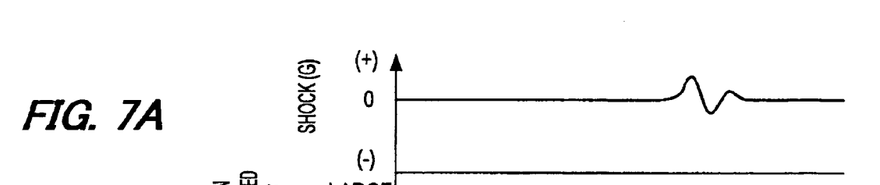
FIG. 7A shows a time dependency of an engaging shock.
Figure 7B:
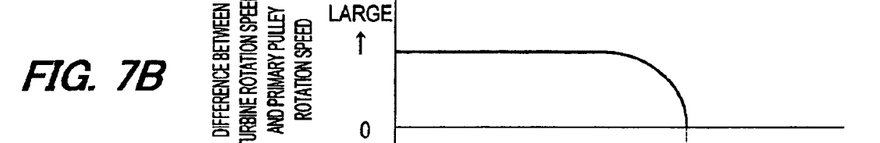
FIG. 7B shows a time variation of the difference between the turbine rotation speed of a torque converter, and the rotation speed of a primary pulley.
Figure 7C:
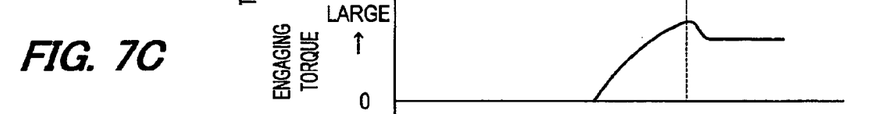
FIG. 7C shows a time dependency of the engaging torque of a clutch.
Figure 7D:
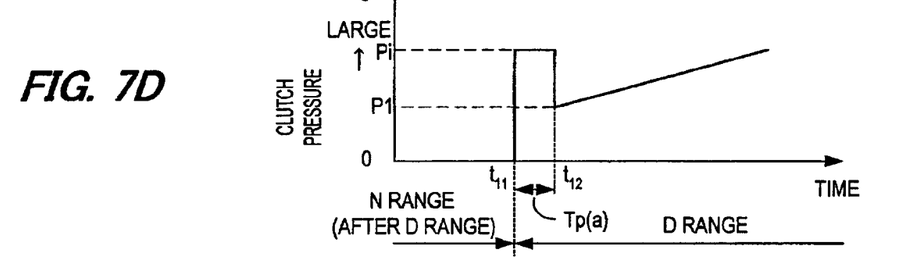
FIG. 7D shows a time dependency of clutch pressure.

At a time t11, after the shift lever 43 moves from the N range position to the D range position, precharge is performed during a time Tp(a) from a time t11 to a time t12 (FIG. 7D). After completing precharge at the time t12 and lowering oil pressure, forward clutch pressure rises gradually (FIG. 7D).

Due to this, the engaging torque increases (FIG. 7C), the rotation of a turbine 50a of the torque converter 50 drops, and at the time when the difference of the rotation speed of the turbine and the rotation speed of the primary pulley is zero (FIG. 7B), the engaging torque reaches a peak (FIG. 7C). The engaging torque is a frictional torque transmitted by the clutch. As there is almost no gear backlash at this time, a shock due to gear collision when the vehicle starts does not arise, and the engaging shock is small (FIG. 7A).

Referring to FIG. 8, the effect when executing the subroutine "B" of Step S21 will now be described.

This is the case where the D range is selected after selecting the N range from the R range. This mode may occur when the vehicle starts for example after parking the vehicle by reversing into a garage.

After the shift lever 43 moves from the R range position to the N range position at a time t21, the oil pressure of the reverse clutch 13 gradually drops. When a predetermined time has elapsed from the time t21 (this determination is performed in the Step S19), at a time t31, the engaging torque of the reverse clutch 13 becomes zero (FIG. 8C). This time t31 can be found beforehand by experiment. Subsequently, after the shift lever 43 moves from the N range position to the D range position at a time t22, precharge is performed only during a time Tp(a) from the time t22 to the time t23 (Step S211).

When precharge has been completed at the time t23, a low clutch pressure is applied until a time t24 (Step S212). This clutch pressure is a little higher than the pressure (Ks×s/Ap), which balances the force with which the clutch piston spring 12c pushes the clutch piston, and which is lower than the initial precharge pressure Pi. By setting the clutch pressure in this way, the forward clutch 12 gradually engages with the planetary gear 11. The time period t23–t24, which is a period when the power train is gradually rotating forwards and backlash disappears, is set beforehand based on the size of the power train. The time period t23–t24 corresponds to the predetermined time period in the Step S213. After the time t24, the forward clutch pressure rises rapidly (Step S214).

Figure 8A:
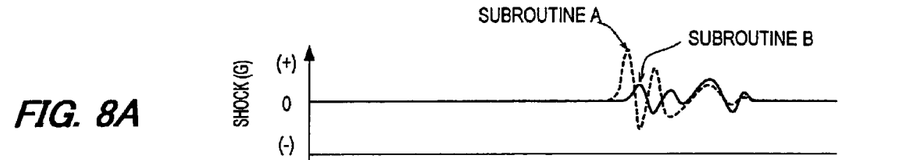
FIG. 8A shows a time dependency of an engaging shock.
Figure 8B:
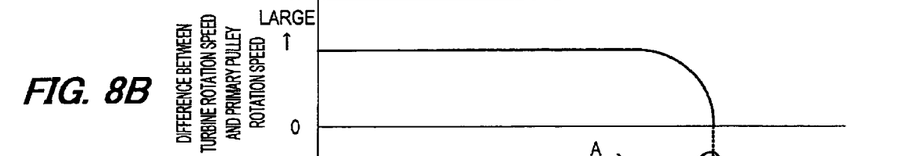
FIG. 8B shows a time variation of the difference between the turbine rotation speed of a torque converter, and the rotation speed of a primary pulley.
Figure 8C:
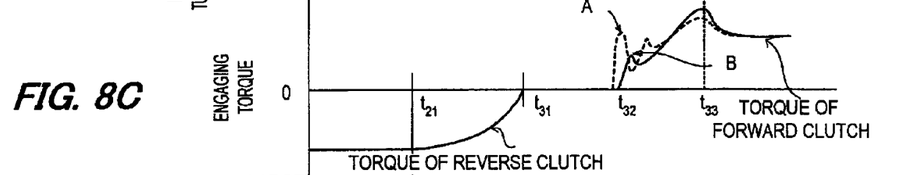
FIG. 8C shows a time dependency of the engaging torque of a clutch.
Figure 8D:
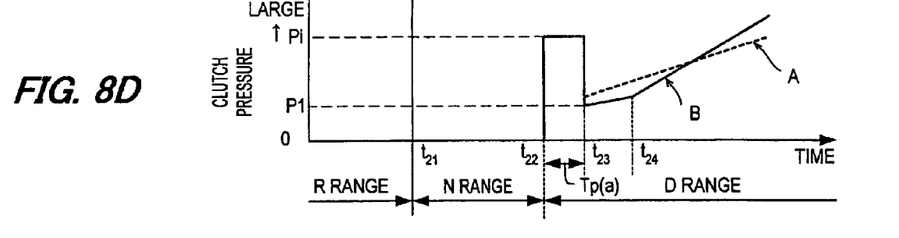
FIG. 8D shows a time dependency of clutch pressure.

As shown by the continuous line of FIG. 8A, by controlling the clutch pressure as previously described, the engaging shock is suppressed (i.e., the engaging shock is small). In contrast, if, after terminating precharge at the time t23, oil pressure is applied as shown by the dashed line of FIG. 8D, without taking the backlash of the power train into consideration, the engaging torque rises considerably as shown by the dashed line of FIG. 8C, such that engaging shock is large (dashed line of FIG. 8A). In this embodiment, however, a low clutch pressure is applied from the time t23 to t24 until the backlash of the power train disappears (continuous line of FIG. 8D), so the forward clutch 12 is gradually engaged with the planetary gear 11. Thus, the increase amount of engaging torque can be suppressed (continuous line of FIG. 8C). Also, after the engaging torque increases at the time t32, the clutch pressure is sharply increased, so the clutch can be engaged while suppressing the engaging shock (continuous line of FIG. 8A). As shown by the continuous line of FIG. 8C, the rotation of the turbine 50a of the torque converter 50 falls; the engaging torque reaches a peak at a time t33, when the difference of the rotation speed of the turbine and the rotation speed of the primary pulley becomes zero (FIG. 8B).

Referring to the graph of FIG. 9, the effect of executing the subroutine "C" of the Step S20 will now be described.

The effect will be described in the case where the D range is directly selected from the R range. This mode may occur for example during counterattack driving.

If the D range is directly selected from the R range at a time t41, precharge will be performed only during a time Tp(a) from the time t41 to a time t42 (Step S201). After precharge is completed at the time t42, a low clutch pressure is applied until a time t43 (Step S202–S203). During the period t42 to t43, the gears of the power train gradually rotate forward, and backlash is lost. During this period, the oil pressure of the reverse clutch 13 has fallen off to zero, and a state of interlock does not arise at a time t51. The period t42 to t43 is set beforehand based on the size of the power train, etc. During this period, the clutch pressure is a little higher than the pressure (Ks×s/Ap), which balances the force with which the clutch piston spring 12c pushes the clutch piston, and which is a lower pressure than the initial precharge pressure. In this way, the forward clutch 12 is gradually engaged with the planetary gear 11. After the time t43, the forward clutch pressure rises sharply (Step S204).

Figure 9A:
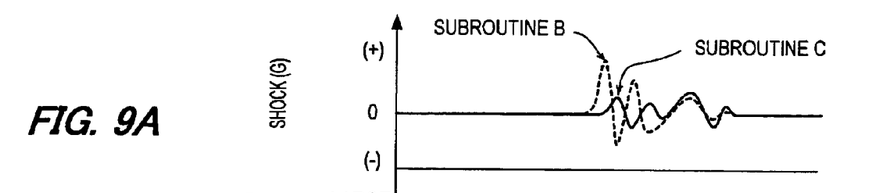
FIG. 9A shows a time dependency of an engaging shock.

As shown by the continuous line of FIG. 9A, the control of clutch pressure suppresses an engaging shock, as previously described. If, after terminating precharge at the time t42, the oil pressure of the forward clutch 12 is raised rapidly before dropping the pressure of the reverse clutch 13 (before a time t51) as shown by the dashed line of FIG. 9D, without taking into consideration whether or not the oil pressure of the reverse clutch 13 has fallen off, the oil pressure will rise considerably as shown by the dashed line of FIG. 9C and the engaging shock will be large as shown by the dashed line of FIG. 9A. For a moment, an interlock state (state wherein the forward clutch 12 and reverse clutch 13 are both engaged with the planetary gear 11) will occur. After the interlock state, if the reverse clutch 13 is released, the engaging shock of the forward clutch 12 will be large.

Figures 9B, 9C:
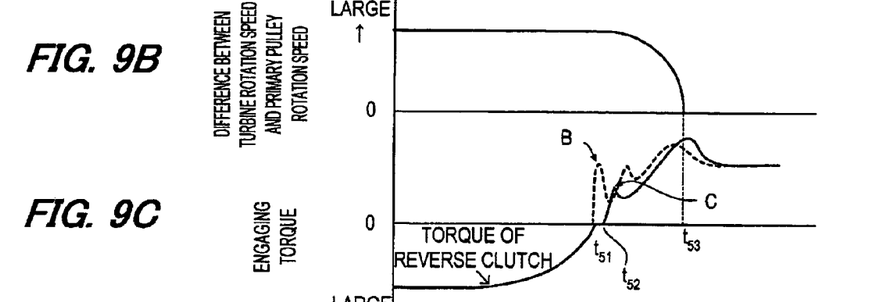
FIG. 9B shows a time variation of the difference between the turbine rotation speed of a torque converter, and the rotation speed of a primary pulley.
FIG. 9C shows a time dependency of the engaging torque of a clutch.
Figure 9D:
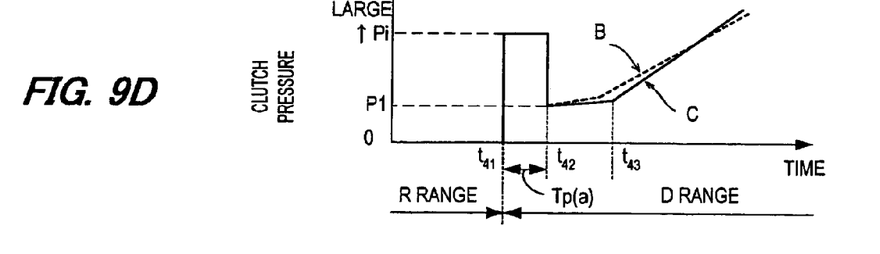
FIG. 9D shows a time dependency of clutch pressure.

In this embodiment, a low clutch pressure is applied from the time t42 to t43 until the oil pressure of the reverse clutch 13 has fallen off to zero so that an interlock does not occur, while the power train gradually rotates forward and backlash is eliminated, as shown by the continuous line of FIG. 9D. For this reason, the forward clutch 12 gradually engages with the planetary gear 11, and the increase amount of engaging torque can be suppressed, as shown by the continuous line of FIG. 9C. After the engaging torque has increased at the time t52, the clutch pressure can be increased at a large increase rate, so that clutch engaging can be performed, while suppressing the engaging shock, as shown by the continuous line of FIG. 9A.

As shown by FIG. 9B, at a time t53 when the difference of the rotation speed of the turbine and the rotation speed of the primary pulley becomes zero due to the rotation of the turbine 50a of the torque converter 50 falling off, the engaging torque reaches a peak, as shown by the continuous line of FIG. 9C.

As described above, when the reverse range is first selected and the neutral range is then selected, followed by the drive range, and when the time for which the neutral range was selected is more than sufficient for the oil pressure supplied to the reverse clutch 13 to decrease to zero, oil pressure is supplied to the forward clutch 12 to perform precharge, which raises it to the initial pressure; then an oil pressure less than the initial pressure is supplied. Subsequently, the oil pressure is increased rapidly after a time has elapsed, until the power train performs forward rotation and backlash stops. Due to this, the oil pressure can be raised in steps, the engaging shock when the vehicle advances can be suppressed. Similarly an engaging shock is not produced also during reverse. As the predetermined time period is set based on the size of the power train, it can be set to a suitable time without using a sensor.

When the range is selected by the shift lever 43 in the order R range →N range →D range, and when the time for which the neutral range was selected is less than sufficient for the pressure supplied to the reverse clutch 13 to decrease to zero, after performing precharge, which supplies oil pressure to the forward clutch 12 to raise it to the initial pressure Pi, the oil pressure is decreased to the predetermined oil pressure P1; after a predetermined time period has elapsed, until backlash is eliminated, the oil pressure is increased at a small increase rate. Hence, the oil pressure can be raised gradually, and the engaging shock due to backlash when the vehicle advances can be suppressed. Similarly, an engaging shock is not produced when the range is selected by the shift lever 43 in the order D range →N range →R range.

Although the invention has been described above by reference to a certain embodiment of the invention, the invention is not limited to the embodiments described above.

For example, in the above embodiments, the transmission was described as a CVT by way of example, but it may also be a planetary gear type, whereby an identical effect is obtained.

Further, in the above embodiments, the case is mainly described where a drive range is finally selected, but a torque shock can be prevented in an identical way also in the case where the reverse range is finally selected. Further, in the above embodiments, the N range is used as the stop range, but the P range may be used instead of the N range.

Further, in the above embodiments, the time at which the backlash is eliminated is preset, but for example a sensor may be provided to the input shaft 21c and output shaft 22c of the power train, and it may be determined that the backlash has been eliminated by detecting the rotation, oil pressure being sharply increased thereafter.

Modifications and variations of the embodiments described above will occur to those skilled in the art, in light of the above teachings. The scope of the invention is defined with reference to the following claims.

The entire contents of Japanese Patent Application P2002-289820 (filed Oct. 2, 2002) are incorporated herein by reference.

What is claimed is:

1. An oil pressure control device for use with a vehicle transmission, which transmission has a shift lever that is configured to select a range from among a drive range that advances the vehicle, a reverse range that reverses the vehicle, and a stop range that stops the vehicle, wherein the vehicle has forward and reverse frictional-engagement devices that convert a drive force generated by an engine to a drive force that advances the vehicle or a drive force that reverses the vehicle, wherein the forward frictional-engagement device is engaged by oil pressure in the drive range, wherein the reverse frictional-engagement device is engaged by oil pressure in the reverse range, and wherein both the forward frictional-engagement device and the reverse frictional-engagement device are released in the stop range, the oil pressure control device comprising:
  a pressure adjusting device that engages or releases the forward frictional-engagement device or the reverse frictional-engagement device by supplying the oil pressure to one of the forward frictional-engagement device and the reverse frictional-engagement device;
  a sensor that detects a range selected by the shift lever; and
  a controller that controls the pressure adjusting device based on a signal from the sensor, wherein the controller is configured to measure a stop-range selected time period during which the stop range is selected after the reverse range, and wherein the controller functions to control the pressure adjusting device to:
    supply an initial oil pressure to the forward frictional-engagement device and subsequently decrease the supplied oil pressure from the initial oil pressure to a predetermined oil pressure, when the drive range is selected after the stop range or the reverse range;
    increase the supplied oil pressure at a small increase rate from the predetermined oil pressure during a predetermined time period; and
    increase the supplied oil pressure at a large increase rate, after the predetermined time period has elapsed,
  wherein, during the predetermined time period, the supplied oil pressure is set depending on the stop-range selected time period.

2. The oil pressure control device as defined in claim 1, wherein the predetermined time period is a period from when the oil pressure is decreased to when a backlash of a power train of the vehicle disappears due to forward rotation of the power train of the vehicle.

3. The oil pressure control device as defined in claim 1, wherein during the predetermined time period, when the stop-range selected time period is shorter than a predetermined value, the supplied oil pressure is set smaller as compared to when the stop-range selected time period is longer than the predetermined value.

4. The oil pressure control device as defined in claim 3, wherein the predetermined value for the stop-range selected time period indicates a time required for the oil pressure supplied to the reverse frictional-engagement device to decrease to zero.

5. An oil pressure control device for use with a vehicle transmission, which transmission has a shift lever that is configured to select a range from among a drive range that advances the vehicle, a reverse range that reverses the vehicle, and a stop range that stops the vehicle, wherein the vehicle has forward and reverse frictional-engagement devices that convert a drive force generated by an engine to drive a force that advances the vehicle or a drive force that reverses the vehicle, wherein the forward frictional-engagement device is engaged by oil pressure in the drive range, wherein the reverse frictional-engagement device is engaged by oil pressure in the reverse range, and wherein both the forward frictional-engagement device and the reverse frictional-engagement device are released in the stop range, the oil pressure control device comprising:
- a pressure adjusting device that engages or releases the forward frictional-engagement device or the reverse frictional-engagement device by supplying the oil pressure to one of the forward frictional-engagement device and the reverse frictional-engagement device;
- a sensor that detects a range selected by the shift lever; and
- a controller that controls the pressure adjusting device based on a signal from the sensor, wherein the controller is configured to measure a stop-range selected time period during which the stop range is selected after the drive range, and wherein the controller functions to control the pressure adjusting device to:
    - to supply an initial oil pressure to the reverse frictional-engagement device and subsequently decrease the supplied oil pressure from the initial oil pressure to a predetermined oil pressure, when the reverse range is selected after the stop range or the drive range;
    - increase the supplied oil pressure at a small increase rate from the predetermined oil pressure during a predetermined time period; and
    - increase the supplied oil pressure at a large increase rate, after the predetermined time period has elapsed,
- wherein, during the predetermined time period, the supplied oil pressure is set depending on the stop-range selected time period.

6. The oil pressure control device as defined in claim 5, wherein the predetermined time period is a period from when the oil pressure is decreased to when a backlash of a power train of the vehicle disappears due to reverse rotation of the power train of the vehicle.

7. The oil pressure control device as defined in claim 5, wherein during the predetermined time period, when the stop-range selected time period is shorter than a predetermined value, the supplied oil pressure is set smaller as compared to when the stop-range selected time period is longer than the predetermined value.

8. The oil pressure control device as defined in claim 7, wherein the predetermined value for the stop-range selected time period indicates a time required for the oil pressure supplied to the forward frictional-engagement device to decrease to zero.

9. An oil pressure control device for use with a vehicle transmission, which transmission has a shift lever that is configured to select a range from among a drive range that advances the vehicle, a reverse range that reverses the vehicle, and a stop range that stops the vehicle, wherein the vehicle has forward and reverse frictional-engagement devices that convert a drive force generated by an engine to a drive force that advances the vehicle or a drive force that reverses the vehicle, wherein the forward frictional-engagement device is engaged by oil pressure in the drive range, wherein the reverse frictional-engagement device is engaged by oil pressure in the reverse range, and wherein both the forward frictional-engagement device and the reverse frictional-engagement device are released in the stop range, the oil pressure control device comprising:
- pressure adjusting means for adjusting the oil pressure from a pump, and for engaging or releasing the forward frictional-engagement device or the reverse frictional-engagement device by supplying the adjusted oil pressure to one of the forward frictional-engagement device and the reverse frictional engagement device;
- sensor means for detecting a range selected by a driver of the vehicle;
- measurement means for measuring a stop-range selected time period during which the stop range is selected after the reverse range;
- first control means for controlling the pressure adjusting means to supply an initial oil pressure to the forward frictional-engagement device and subsequently decrease the supplied oil pressure from the initial oil pressure to a predetermined oil pressure, when the drive range is selected after the stop range or the reverse range;
- second control means for controlling the pressure adjusting means to increase the supplied oil pressure at a small increase rate from the predetermined oil pressure during a predetermined time period; and
- third control means for controlling the pressure adjusting means to increase the supplied oil pressure at a large increase rate after the predetermined time period has elapsed,
- wherein, during the predetermined time period, the supplied oil pressure is set depending on the stop-range selected time period.

10. An oil pressure control device for use with a vehicle transmission, which transmission has a shift lever that is configured to select a range from among a drive range that advances the vehicle, a reverse range that reverses the vehicle, and a stop range that stops the vehicle, wherein the vehicle has forward and reverse frictional-engagement devices that convert a drive force generated by an engine to a drive force that advances the vehicle or a drive force that reverses the vehicle, wherein the forward frictional-engagement device is engaged by oil pressure in the drive range, wherein the reverse frictional-engagement device is engaged by oil pressure in the reverse range, and wherein both the forward frictional-engagement device and the reverse frictional-engagement device are released in the stop range, the oil pressure control device comprising:
- pressure adjusting means for adjusting the oil pressure from a pump, and for engaging or releasing the forward frictional-engagement device or the reverse frictional-engagement device by supplying the adjusted oil pressure to one of the forward frictional-engagement device and the reverse frictional engagement device;
- a sensor means for detecting a range selected by a driver of the vehicle;
- measurement means for measuring a stop-range selected time period during which the stop range is selected after the drive range;

first control means for controlling the pressure adjusting means to supply an initial oil pressure to the reverse frictional-engagement device and subsequently decrease the supplied oil pressure from the initial oil pressure to a predetermined oil pressure, when the reverse range is selected after the stop range or the drive range;

second control means for controlling the pressure adjusting means to increase the supplied oil pressure at a small increase rate from the predetermined oil pressure during a predetermined time period; and third control means for controlling the pressure adjusting means to increase the supplied oil pressure at a large increase rate after the predetermined time period has elapsed, wherein, during the predetermined time period, the supplied oil pressure is set depending on the stop-range selected time period.

* * * * *